United States Patent Office 2,795,537
Patented June 11, 1957

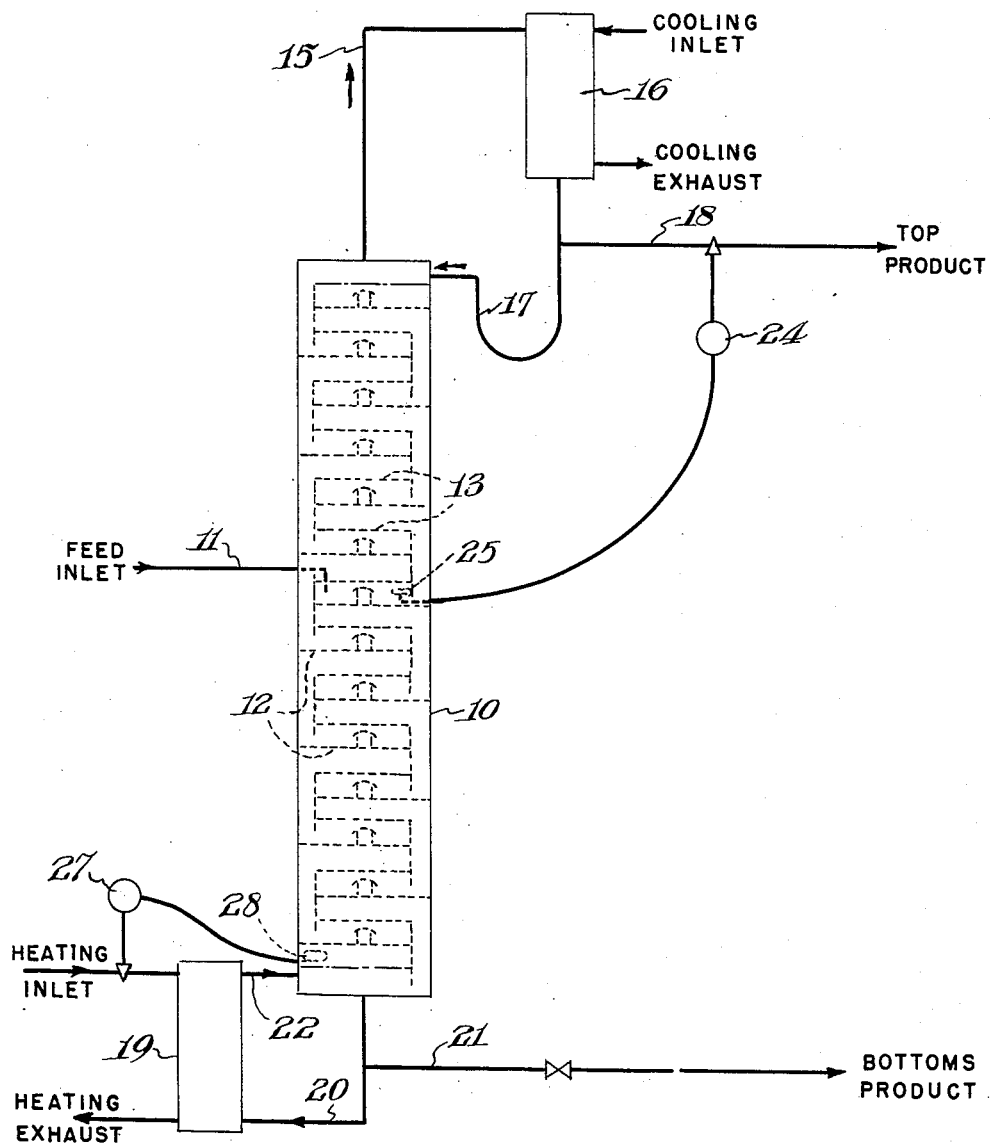

2,795,537

DISTILLATION OF XYLENE FROM DIMETHYL TEREPHTHALATE

Harold Steen Kemp, Elsmere, and Cyrus Pyle, New Castle, Del., assignors to E. I. du Pont de Nemours & Company, Wilmington, Del., a corporation of Delaware Application June 21, 1952, Serial No. 294,764

1 Claim. (Cl. 202—40)

This invention relates to an improved method of distillation, and particularly to an improved method for the distillation separation of two components having relatively widely different volatilities.

From the standpoint of the fractionation required, the distillation separation of two components of relatively widely different volatilities can be accomplished in columns having a comparatively small number of plates. The average difference in temperature between successive plates in such a column is often quite considerable, and slight changes in the temperature, composition, or rate of supply of the feed or of the reflux causes a rapid and marked change in the composition and boiling temperature of material held on a given plate. In actual practice the temperature difference between a given pair of adjacent plates in a column may be considerably greater than the average difference determined by simply dividing the temperature differential over the entire column by the number of plates, and in these regions the compositions and boiling temperatures are particularly subject to change. Sudden and great changes in the temperature of the material held on the plate at which the sensing element of an automatic control device is located creates a condition which the control instrument cannot cope with and the instrument commences cycling, whereupon control is rendered difficult or even impossible and product quality declines.

It is an object of this invention to provide a method of distillation wherein the rate of change of temperature on the plates of the column is prevented from exceeding the safe operative rate of response characteristics of conventional control instruments. Another object of this invention is to provide a method of distillation having an improved stability of operation. Another object is to provide a method of distillation wherein the column displays a good dynamic response to the control system. Yet another object is to ensure an even distribution of the liquid load among the several plates of the column. The manner in which these and other objects of this invention are attained will become apparent from the following detailed description and the single diagrammatic drawing illustrating one embodiment of the invention as applied to a bubble cap column used for the distillation separation of xylene from dimethyl terephthalate.

Dimethyl terephthalate, $C_6H_4(COOCH_3)_2$, is manufactured by the catalytic reaction of methanol with terephthalic acid. The catalyst and the bulk of the other contaminants are removed from the crude ester by a water wash and successive crystallizations from xylene to yield a product contaminated primarily with xylene, methyl benzoate and methyl hydrogen terephthalate, although lesser amounts of other impurities may also be present. The xylene is recovered as a vaporous product by distillation, and the xylene-free dimethyl terephthalate is withdrawn as a bottoms product and subjected to further purification as required by the use to which it is put, such as artificial fiber manufacture, for example.

The separation of xylene from dimethyl terephthalate can be effected in apparatus such as that represented in the drawing, wherein 10 is a bubble cap column supplied with feed through line 11, which preferably discharges at a plate near the mid-section of column 10. Vaporous xylene is withdrawn through line 15 and condensed in indirectly cooled condenser 16, from which part of the liquid xylene is returned to the column as reflux through line 17, while the remainder is recovered as product through line 18. The bottoms liquid is circulated continuously through shell-and-tube type heater 19 by lines 20 and 22, and xylene-free dimethyl terephthalate product is withdrawn from the system through valved line 21.

A variety of automatic control arrangements are conventionally employed for distillations of the character hereinabove described; however, a preferred system controls in accordance with the conditions existing at two points by the regulation of the withdrawal of the xylene product and the regulation of the supply of heating fluid circulated to heater 19. The withdrawal of the xylene top product is regulated by flow controller 24 responsive to a temperature sensing element 25 mounted on the plate at which the feed is introduced. Heater 19 is regulated by flow controller 27 actuated by pressure-sensitive element 28 disposed at the base of column 10.

The fractionation required for the separation of xylene from dimethyl terephthalate is provided by fourteen bubble cap plates 12 carrying a liquid level represented at 13 and, with atmospheric pressure at the top of column 10, the temperature of the xylene overhead is 145° C., while the temperature of the bottoms product is 285° C. It has hitherto been the practice to maintain a limiting seal depth of about 1.25" over the tops of the bubble cap slots in order to avoid thermal degradation of the dimethyl terephthalate, which occurs to an appreciable extent in the temperature range at which distillation purification is effected and is, of course, a function of the residence time of the dimethyl terephthalate within the column. The average calculated temperature difference between successive plates of the column is therefore 10° C., but temperature measurements at various points show that the differences between adjacent plates for the first four below the feed point are actually of the order of about 18° C. Under these conditions very slight changes in the composition, supply rate, or temperature of either the feed or the reflux result in relatively large and rapid changes in composition and hence in the temperature of material boiling on the plates 12. Conventional control instruments, subjected to the usual fluctuations in feed and reflux compositions and temperatures encountered in distillation, have proved unreliable where the average temperature difference between successive plates exceeds about 3–5° C.

We have now found that it is possible to overcome the effects of fluctuations in feed and reflux compositions and temperatures by maintaining a relatively large amount of material on the plates at all times such that the rate of change of composition and hence the rate of change of the temperature of the material on the plates is reduced to a level within the safe rate of response characteristics of conventional control apparatus. A substantial improvement results when a large amount of material is maintained only on the plates on which the temperature sensing elements of the control instruments are inserted, but it is preferred to maintain approximately equal quantities on all of the plates, for the reason that the effect of fluctuations is thereby distributed over a greater amount of material than is practicable with a single plate and stability of column operation is also improved. An additional advantage of maintaining equal quantities of material on all of the plates is that the location of the temperature sensing element of the control instrument is not then limited to a particular plate, but the element may be mounted elsewhere if experience in operation indicates that a change in position is desirable.

The precise amount of material which it is necessary to maintain on the plates to reduce the temperature rate of change to limits within which satisfactory operation of control instruments will be attained will depend upon the temperature difference which exists between successive plates in the specific distillation involved, and also on the range within which fluctuations in temperature and composition of feed and reflux occur, and on the volume of liquid held up within the column. We have found that a seal depth greater than about 2.5" over the tops of the bubble cap slots is ordinarily sufficient to obtain a definite improvement in control, however, it is preferred to operate with somewhat deeper seals because of the increased stability thereby secured. In a typical case wherein xylene was separated from dimethyl terephthalate, in the apparatus hereinabove described, it was found that good results were obtained when the minimum seal in terms of the depth of clear liquid measured above the top of the bubble cap slots at the outlet weir was maintained at 3.5". The conditions of operation were as follows:

|  | Feed | Distillate | Bottoms |
|---|---|---|---|
| Flow rate, lbs./hr | 44.1 | (1) | (2) |
| Temperature, ° C | 145 | 145 | 285 |
| Column press. at point of supply or withdrawal, mm. Hg abs | 795 | 760 | 840 |
| Composition (wt. percent): |  |  |  |
| Xylene | 25.0 | 100 | 0 |
| Low-boiling impurities | 0.80 | 0 | 0.601 |
| Dimethyl terephthalate | 73.83 | 0 | 99.12 |
| Methyl hydrogen terephthalate | 0.37 | 0 | 0.279 |

[1] 16.5 (of which 5.5 lb. was returned as reflux and 11.0 lbs. was withdrawn from the system).
[2] 33.1 lb. passed to 2nd distillation zone.

It will be understood that this invention is applicable to distillation columns of the plate type and is not restricted to those having bubble caps, the only requirement being that suitable weirs or other devices must be provided to maintain the proper quantity of material on the plates. Since numerous modifications will occur to persons skilled in the art without constituting a departure from the essential spirit of this invention, it is intended to be limited only within the scope of the following claim.

What is claimed is:

In the distillation separation of xylene from dimethyl terephthalate containing minor quantities of methyl hydrogen terephthalate and other impurities boiling at temperatures above the boiling point of xylene in a bubble cap column wherein said xylene is recovered as an overhead product and said dimethyl terephthtlate, methyl hydrogen terephthalate and said other impurities are recovered as a bottoms product and wherein the average temperature difference between successive plates of said column is in excess of about 5° C. and wherein a control temperature is sensed by a temperature sensing element mounted within said column and adjacent one of the plates of said column, the improvement comprising maintaining a depth of material in distillation on the plate where said control temperature is sensed greater than about 2.5" over the tops of the bubble cap slots to thereby maintain the rate of change of temperature of said material during the course of said distillation separation within the safe operative rate of response characteristic of a control instrument actuated by said control temperature.

References Cited in the file of this patent
UNITED STATES PATENTS

| 2,022,809 | Kramer | Dec. 3, 1935 |
| 2,143,015 | Kleinschmidt | Jan. 10, 1939 |
| 2,222,565 | Kraft | Nov. 19, 1940 |
| 2,252,550 | Bragg | Aug. 12, 1941 |
| 2,281,282 | Gerhold | Apr. 28, 1942 |
| 2,456,398 | Gerhold | Dec. 14, 1948 |
| 2,485,237 | Gresham et al. | Oct. 18, 1949 |
| 2,527,655 | Pyle et al. | Oct. 31, 1950 |
| 2,684,326 | Boyd, Jr. | July 20, 1954 |